UNITED STATES PATENT OFFICE.

JOHN C. TALIAFERRO, OF BALTIMORE, MARYLAND.

SEALING COMPOSITION.

965,765.

Specification of Letters Patent. Patented July 26, 1910.

No Drawing.

Application filed December 8, 1909. Serial No. 532,053.

*To all whom it may concern:*

Be it known that I, JOHN C. TALIAFERRO, a citizen of the United States, residing at Baltimore, in the State of Maryland, have invented certain new and useful Improvements in Sealing Compositions, of which the following is a description.

The invention relates to new and useful improvements in sealing compositions, more especially for use in connection with the manufacture of the well known double seam or sanitary cans.

An object of the invention is to provide a sealing substance which may be readily applied to a can end without the throwing off of volatile products, which may be more or less poisonous or objectionable.

To this end, the invention consists in providing a sealing substance which is plastic at ordinary temperatures, but which may be liquefied under heat, so that said substance may be applied to the can end while heated, and as soon as the substance cools, a coating of a non-volatile plastic adhesive material is secured, which is subsequently rolled in the seam or joint, thus forming a hermetic joint.

A further object of the invention is to provide a sealing substance which is not materially affected by exposure to air. I accomplish this object by using materials in the formation of my sealing composition, which materials are non-volatile in character, and not affected by air, and consequently a coating of my sealing material when applied to a can end does not deteriorate if a considerable period of time elapses before said end with the coating thereon is attached to the can body.

A still further object of the invention is to provide a non-volatile plastic adhesive sealing material, which is comparatively soft at ordinary temperatures, and which may be readily liquefied by heat, so that the same may be applied in a thin layer to the part of the can end that is to be subsequently rolled into the joint.

While it is necessary that the sealing substance shall have the above characteristics, in order to be efficiently applied and used for the purpose described, it is also equally necessary that said substance will be adhesive and cementing in character, in order that a tight joint may be produced. It is also necessary that the sealing substance shall resist corrosive food acids, and be harmless, substantially tasteless, and free from odor.

I have found that the most suitable base for a composition having the characteristics above mentioned, is a prepared semi-solid sap of certain plants or trees containing a gum closely resembling rubber, and a resinous substance in quantities sufficient to prevent or protract the oxidization of the gum. One substance of this character is known in the trade as "Pontianac" rubber. This contains from 10 to 15% of a gum closely resembling rubber, and from 50 to 60% of resin, the remainder of the substance consisting largely of impurities. Another substance of this character is known in the trade as "Cantella" gum. This contains from 80 to 90% of a gum closely resembling rubber, and 10 to 20% of resin.

I have found that a sealing composition consisting entirely of either of the above base substances, is slightly sticky when applied as a coating, and, therefore, partly for the purpose of rendering said coating less adhesive, and partly for the purpose of fluxing the base substance, I add thereto from 5% to 15% of a permanent flux, such as wax, preferably a hard paraffin wax. The wax gives to the coating a smooth, substantially hard surface, which protects the same. It is also sometimes desirable to add to the composition, asbestos or some similar material, in order to give body to the mixture. From 10% to 30% of ground pure asbestos is preferably used, and this is added to the mixture when said mixture is in a melted condition.

It will be understood that the proportions of the various ingredients may be varied without departing from the spirit of my invention. It will also be understood that other substances besides "Pontianac" rubber or "Cantella" gum, may be used, provided said substances contain a certain per cent. of gum and a certain per cent. of abietic acid.

The composition above described is plastic at ordinary temperatures, but by the application of varying degrees of heat, up to 300° F., its viscosity may be changed. It is non-volatile and gives off no odors. It is practically tasteless, and has no injurious effects upon the contents of the cans. It is not affected by the food acids, and consequently the contents of the cans do not in any way affect its sealing qualities.

Having thus described my invention, what I claim as new and desire to secure by Letters Patent, is:—

1. A plastic sealing material consisting of a semi-solid sap, containing a gum closely resembling rubber and a resinous substance in quantities sufficient to prevent or protract the oxidization of the rubber, and a permanent flux.

2. A plastic sealing material consisting of a semi-solid sap, containing a gum closely resembling rubber and a resinous substance in quantity sufficient to prevent or protract the oxidization of the rubber, and a paraffin wax.

3. A plastic sealing material, consisting of a semi-solid sap, containing a gum closely resembling rubber and a resinous substance in quantity sufficient to prevent or protract the oxidization of the rubber, a paraffin wax, and asbestos.

4. A plastic sealing material consisting of from 55 to 85 parts of a semi-solid sap, containing a gum closely resembling rubber and a resinous substance in quantity sufficient to prevent or protract the oxidization of the rubber, 5 to 15 parts of paraffin wax, and from 10 to 30 parts of asbestos.

In testimony whereof I affix my signature, in presence of two witnesses.

JOHN C. TALIAFERRO.

Witnesses:
FRANK SCHNEIDER,
H. SCHUTZ.